(12) United States Patent
Hobgood et al.

(10) Patent No.: US 7,042,421 B2
(45) Date of Patent: *May 9, 2006

(54) METHOD FOR ADVANCED IMAGING IN AUGMENTED REALITY

(75) Inventors: Andrew W. Hobgood, Manchester, NH (US); John Franklin Ebersole, Jr., Bedford, NH (US); John Franklin Ebersole, Bedford, NH (US)

(73) Assignee: Information Decision Technologies, LLC., Bedford, NH (US)

( * ) Notice: Subject to any disclaimer, the term of this patent is extended or adjusted under 35 U.S.C. 154(b) by 79 days.

This patent is subject to a terminal disclaimer.

(21) Appl. No.: 10/825,762

(22) Filed: Apr. 16, 2004

(65) Prior Publication Data

US 2005/0275664 A1    Dec. 15, 2005

Related U.S. Application Data

(63) Continuation-in-part of application No. 10/198,584, filed on Jul. 18, 2002, now Pat. No. 6,903,707.

(51) Int. Cl.
*G09G 5/00* (2006.01)
(52) U.S. Cl. .............................. 345/8; 345/7; 348/115
(58) Field of Classification Search ................ 345/7–9; 348/115, 368, 373
See application file for complete search history.

(56) References Cited

U.S. PATENT DOCUMENTS 5,815,411 A * 9/1998 Ellenby et al. ............. 702/150
5,838,368 A * 11/1998 Masunaga et al. ......... 348/211.9
6,301,440 B1 * 10/2001 Bolle et al. ................. 396/128

* cited by examiner

*Primary Examiner*—Regina Liang
*Assistant Examiner*—Duc Dinh
(74) *Attorney, Agent, or Firm*—Brian M. Dingman, Esq.; Mirick, O'Connell, DeMallie & Lougee

(57) ABSTRACT

The invention is a method for displaying otherwise unseen objects and other data using augmented reality (the mixing of real view with computer generated imagery). The method uses image parameters (such as field of view, focus, aperture, and shading) that affect the real world view as captured by a camera. The camera may have a motorized camera mount that can report the position of a camera on that mount back to a computer. With knowledge of where the camera is looking and the additional image parameters, the computer can precisely overlay computer-generated imagery onto the video image produced by the camera such that the appearance of computer-generated imagery is consistent with the image of the real world. The method may be used to present to a user such items as existing weather conditions, hazards, or other data, and presents this information to the user by combining the computer generated images with the user's real environment. These images are presented in such a way as to display relevant location and properties of the computer-generated imagery to the system user. The primary intended applications are as tools for training and monitoring of surveillance systems, disaster command and control response training and operations, and any application in which it is desired to have realistic imagery that corresponds to the real world.

8 Claims, 2 Drawing Sheets

METHOD FOR ADVANCED IMAGING IN AUGMENTED REALITY

CROSS REFERENCE TO RELATED APPLICATION

This application is a continuation in part of patent application Ser. No. 10/198,584, filed on Jul. 18, 2002 now U.S. Pat. No. 6,903,707.

FIELD OF THE INVENTION

This invention relates to computer graphics and augmented reality.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

It is sometimes useful to superimpose computer-generated graphics onto the real world view a camera is displaying. The appearance of the camera's view of the real world is subject to a complex combination of parameters, including, but not limited to, various light levels, movement, and areas of focus and blurring. In order to be most realistic, the appearance of the superimposed computer-generated graphics should maintain continuity with the camera's view of the real world.

This invention can be used any time a user needs to "see" an otherwise invisible object placed within the setting in which it would normally appear, and in this case, onto a video stream. This form of image "augmentation" is known as augmented reality (AR), and in this case is considered video-based AR since it is only a video camera, as opposed to a see-through setup (as might be done with partial mirrors). A video-based AR setup has only a few basic components, including (1) a camera with a known field of view (FOV), (2) a method to determine the position and orientation of the camera, (3) a method to determine the various other image parameters (such as focus, aperture, shading, etc.), and (4) a computer that creates computer-generated virtual objects that exhibit the same parameters as the image the camera is seeing by using the previous three components.

The invention creates an AR setup by using a simple, compact, inexpensive, integrated tracking system combined with an instrumented video camera in one small unit. Such a camera and tracking combination device is the EVI-D30 Motorized Camera, from Sony.

SUMMARY OF THE INVENTION

This invention utilizes a multiple sensor-instrumented camera to obtain multiple imaging parameters (such as focus, field of view, and aperture) and to capture an image of the real world, as well as to determine position and orientation of the camera. A computer, which is also a component of the invention, then renders virtual (computer-generated) graphical elements which correspond to those imaging parameters, and to the position and orientation of the camera and lens. The method uses augmented reality (AR) (defined as the mixing of real imagery with virtual imagery) to present information in a format that combines the virtual images with the user's real environment as captured by the video camera.

This invention facilitates the blending of computer-generated (virtual) graphical elements with a real-world view. Many imaging parameters affect the view captured by a camera. To accomplish a higher quality AR image, those same imaging parameters should affect the appearance of the computer-generated elements that are to be mixed with the real-world view. For example, if a portion of an image appears blurred when viewing it though a camera, the computer-generated graphical elements that will appear in the final augmented display of that area of the image should also appear blurred. The result is a realistic combined virtual and real image which is available to a user via Head-Mounted Display or other more traditional display device such as a computer monitor.

DETAILED DESCRIPTION OF THE PREFERRED EMBODIMENTS OF THE INVENTION

The preferred embodiment of the invention utilizes a camera to capture an image of the real world. The camera is instrumented with sensors that obtain one or more of the imaging parameters used by the lens and camera, and sensors that determine the position and orientation of the camera. A computer is used to render virtual (computer-generated) graphical elements corresponding to the imaging parameters, position, and orientation of the camera and lens. The properties of the computer-generated graphical elements are determined by an independent source (e.g., the user, sensor information, or other method of input). The method uses augmented reality (AR) (the mixing of real imagery with virtual imagery) to present this information in a format that combines the virtual images with the user's real environment. The user then visualizes the combined virtual and real image via a traditional interface such as a computer monitor, or via another method, such as a Head-Mounted Display (HMD).

Figure 1:
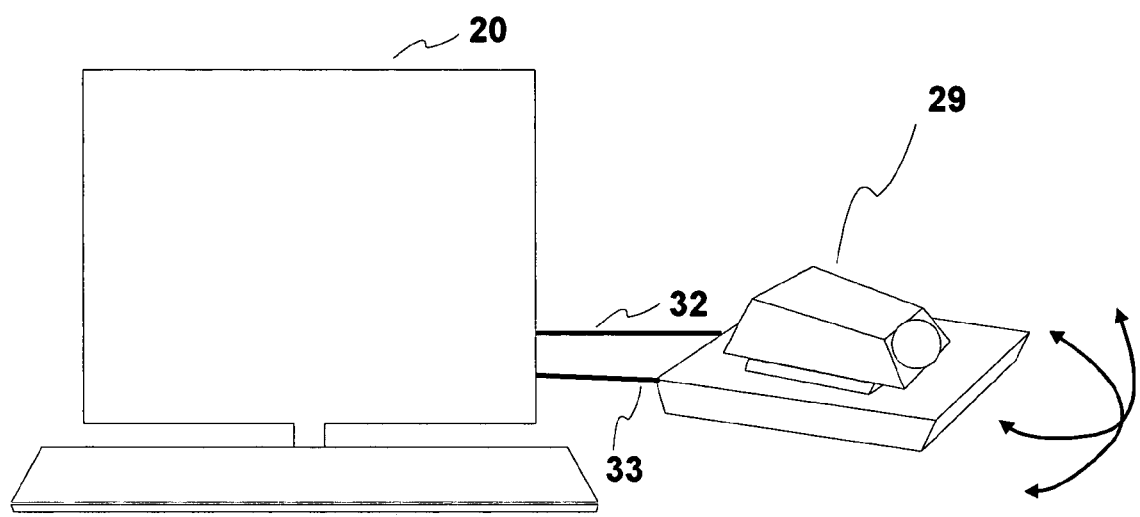
FIG. 1 is a schematic view of a motorized camera and motorized mount connected to a computer for the purpose of tracking and video capture for augmented reality, for use in the preferred embodiment of the invention.

FIG. 1 illustrates hardware for use in the preferred embodiment of the invention. A motorized video camera 29 is used as a tracking system for AR. By connecting the motorized video camera 29 to the computer 20 via an RS-232 serial cable 33 (for camera control and feedback) and video cable 32, the camera may be aimed, the position of the camera can be queried, and the image seen by the camera may be captured over the video cable 32 by software running on the computer. Additionally, the computer 20 can query the camera 29 for its current field of view, a necessary piece of information if the computer image is to be rendered properly.

Figure 2:
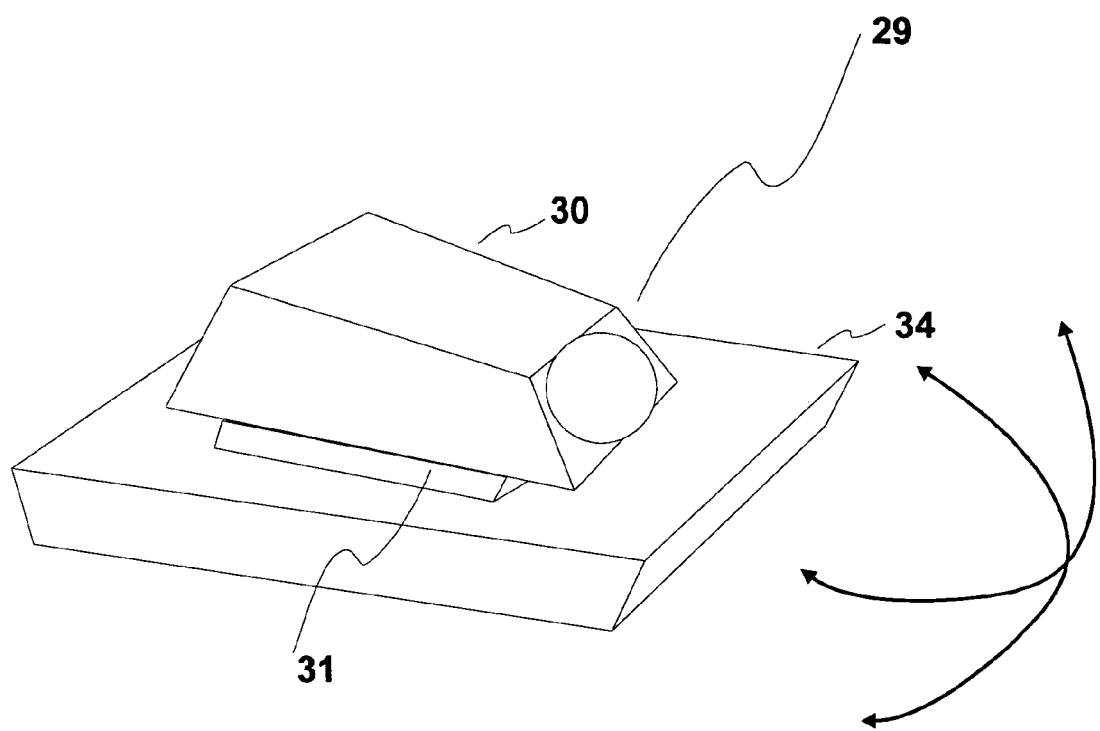
FIG. 2 is a close-up view of the camera and motorized mount of FIG. 1.

FIG. 2 is a close-up view of the preferred Sony EVI-D30 motorized camera 29. The camera is composed of a head 30 and a base 34 coupled by a motorized mount 31. Mount 31 can be panned and tilted via commands from the computer system, which allows the head 30 to move while the base 34 remains stationary. The camera also has internal software, which tracks the current known pan and tilt position of the head with respect to the base, which may be queried by computer 20 over the RS-232 serial cable.

The video signal from the camera travels into a video capture, or "frame grabber" device connected to the computer. In this embodiment of the invention, an iRez "USB Live!"™ video capture device is used, which allows software on the computer to capture, modify, and display the image on the screen of the computer. The captured video image of the real world is mixed with the computer-generated graphical (virtual) elements via onboard or external image combiner to form an AR display. Onboard mixing is performed via software. External mixing can be provided by commercial off-the-shelf (COTS) mixing hardware, such as a Videonics video mixer or Coriogen Eclipse keyer. Such an external solution would accept the video signal from the camera and a computer-generated video signal from the computer and combine them into the final AR image.

The imaging parameters, position, and orientation of the camera and lens may be obtained through any combination of a number of means. In the case of a fully electronic camera mount and optics control system (such as an electronic pan-tilt-zoom camera like the Sony EVI-D30), the information can be obtained directly from the computer via communications with the camera's built-in encoders and sensors. These sensors can be commanded or queried directly to obtain the imaging information.

On a manual camera and lens assembly (such as a film/movie camera), the camera and lens assemblies may be instrumented with a combination of encoders and sensors to detect the configuration of the camera's apparatus. The camera may then be controlled as usual by a camera operator, and the imaging parameters may be requested from the sensors by the computer.

Finally, partially-automated cameras (such as consumer camcorders) with some internal electronics (e.g., auto-focus and auto-aperture) may use a combination of the above approaches, for example using internal electronics to provide some parameters (such as focus), while additional sensors may be fitted to the camera to obtain the remaining parameters (such as position).

Many imaging parameters may affect the view captured by the camera, and therefore, should affect the computer-generated elements that are to be mixed with the real-world view. These parameters include field of view, focus, aperture, exposure time, light sensitivity (for a charge-coupled device [CCD] imaging element), and light level.

In many camera systems, field of view (also known as zoom) is often fixed for a certain camera and lens combination. Many AR systems rely on this, and are calibrated for a specific field of view; all computer-generated elements are rendered to correspond to that field. Many applications, including surveillance, security, and remote monitoring, utilize camera systems that have variable field of view, such that small or distant objects can be magnified for closer examination. By supporting variable field of view, AR may be applied to these systems.

Similarly, in many systems, focus can be fixed at infinity and all objects that are not in the near field will appear sharp. As long as a system does not usually require interaction with near-field objects, this is sufficient. If a system is often applied in near-field applications or narrow depth-of-field applications, such as medical imaging, surgical assistance, microscopy, or long-distance viewing (e.g., telephoto lenses, etc.), focus becomes an important feature. As such, selectively blurring out-of-focus elements in the computer-generated scene becomes important in order to maintain continuity with the real-world view, or to highlight information that is specific to a particular focus level or depth. That is, if a region isn't within the sharp, focused region of the real-world scene, computer-generated elements that correspond to that area may be selectively disabled, colored, or blurred to represent lower relevance.

In situations where a camera uses variable aperture, exposure time, and light sensitivity, or where the scenes commonly visualized by the camera have drastically different light levels, the computer-generated elements may need to be colored differently (darker or lighter) in order to maintain visual continuity with the real-world view. That is, as any of those parameters increases in magnitude or duration, the amount of light captured will increase, and the view will appear brighter. As such, any computer-generated elements rendered to match this view will need to be correspondingly brightened.

Finally, exposure time can also affect motion blurring of objects. If exposure time is long, fast-moving objects will appear to blur or smear across the view. If it is desirable for the computer-generated elements to behave consistently with the real objects in the scene, a motion blur effect can be simulated by the computer so that the appearance of the computer-generated elements is similar to that of the real-world view.

In some applications, any combination of these imaging parameters may be fixed and known (or estimated) prior to capturing the real-world view, while others remain variable and are detected by sensors. The invention provides for any of these parameters to remain fixed while still permitting other parameters to affect the computer-generated elements. This permits for fewer sensors to be attached to only the most important imaging parameters of the system, allowing for lower cost and rendering complexity.

Position and orientation of the camera can be determined by any one of a number of means, including a fully motorized camera that can be moved in position and orientation, or a partially motorized camera with fixed position but is movable in orientation. Similarly, if a camera is completely fixed, but the position and orientation are known, it may be used as described above. Likewise, a 3 DOF tracking system (such as the "InterSense IS-300 InertiaCube"™ system) may be used to determine the orientation of a camera, while its position remains fixed. A 6 DOF tracking system (such as the "InterSense IS-900 SimTracker"™ system) can determine both the position and orientation of the camera.

In many cameras, field of view (also known as zoom) is controlled by an electronic actuator that arranges the optics of the camera. This actuator has a control circuit which is calibrated to a particular range, and can be queried to obtain the current field of view of the camera. Similarly, in manual cameras, a rotating knob or ring is located around the camera's optics, and is twisted to change the field of view. By attaching a potentiometer or rotary encoder, the current setting of the knob or ring can be obtained, and the corresponding field of view can be computed.

Similarly, focus is also controlled by an electronic actuator in many cameras (hence the term "autofocus"). In the same way as field of view, the control circuit for the focus adjustment can be queried to obtain the current focus setting. Also, in manual cameras, a rotating ring is often located on the camera to control focus. As in the case of field-of-view, a potentiometer or rotary encoder can be attached to the focus ring to obtain a focus setting.

Aperture (also known as iris) and exposure time (also known as shutter speed) are usually electronically controlled in automatic cameras, and as such, the camera's electronics may be directly queried to obtain their settings. In manual camera systems, both of these settings are adjusted by rotating knobs. Just as with field of view and focus, potentiometers or rotary encoders can be attached to the knobs and queried electronically to obtain the current settings.

In cameras with an electronic imaging element such as a CCD, light sensitivity for the imaging element is controlled by the camera's electronics to optimize the contrast of the image and to eliminate bloom and washed-out images. This light sensitivity number can be obtained by querying the camera electronics directly.

Finally, the light level in the image as seen by the camera may either be computed by the camera's electronics (and used to automatically adjust aperture, exposure time, and light sensitivity parameters) or computed by the computer system that is capturing the real video image.

Applications exist for any environment in which it is desirable to present an Augmented Reality environment to the user with computer-generated elements that are rendered realistically to match the real-world image. Particularly, in surveillance systems, imagery that is rendered to match the real-world image can be used as markup in an operational context to indicate potential threats or intruders in the environment. For training, the same system can be used to generate markup as well as a simulated threat or intruder seamlessly in the environment. This can drastically improve operational readiness and vigilance in monitoring.

In disaster command and control response operations, realistic computer-generated imagery can be used to represent potential hazards and response team actions to provide a cohesive visualization of response to a disaster. In training, the same technology can be used to create simulated disasters that appear realistic to the user.

The invention claimed is:

1. A method for using advanced image information to increase the quality of an Augmented Reality (AR) image comprising the image from a camera combined with computer-generated graphics to create an AR display, and for using a motorized camera mount for the camera in a tracking system for AR, the method comprising:

capturing an image or view of the real world with a camera having a lens, the camera being moved by a motorized camera mount;

obtaining one or more imaging parameters of the camera and camera lens, the imaging parameters selected from the group consisting of focus, aperture, field of view, exposure time, light sensitivity setting and measured light level;

determining at least the orientation of the camera by using a computer to obtain information from the motorized camera mount;

in response to at least the camera orientation received by the computer from the motorized camera mount, using the computer to control the aim of the camera by sending control signals to the motorized camera mount to move the camera to a specified orientation, wherein the control signals cause the motorized camera mount to move the camera to the specified orientation, to thus accomplish a feedback-based camera position control system;

in response to the camera orientation received by the computer from the motorized camera mount and in response to the obtained imaging parameters, using a computer to render a graphical image representing unseen information that corresponds to the known orientation of the camera viewpoint, wherein the unseen information is rendered such that it is visually consistent with the obtained imaging parameters, and the orientation of the camera;

augmenting the image or view of the real world with the computer generated image; and presenting the augmented image or view to the user.

2. The method of claim 1 wherein the imaging parameters are provided by the camera via communication to the computer.

3. The method of claim 1 wherein the imaging parameters are obtained by one or more sensors attached to the camera or lens.

4. The method of claim 1 wherein the imaging parameters are provided by a combination of the camera and sensors attached to the camera or lens.

5. The method of claim 1 in which at least one imaging parameter is fixed and known prior to capturing the image, and at least one imaging parameter is variable and obtained as it varies.

6. The method of claim 1 in which the determining step comprises using a motorized camera mount to provide the orientation of the camera, in conjunction with a previously determined position of the mount.

7. The method of claim 1 in which the determining step comprises using an independent 3DOF tracking system to determine the orientation of the camera at a known position.

8. The method of claim 1 in which the determining step comprises using an independent 6DOF tracking system to determine the position and orientation of the camera.

* * * * *